April 18, 1967          D. A. PAICE          3,315,146

INVERTERS OPERATED BY CONTROLLED RECTIFIERS

Filed Nov. 7, 1963          2 Sheets-Sheet 1

United States Patent Office 3,315,146
Patented Apr. 18, 1967

3,315,146
INVERTERS OPERATED BY CONTROLLED RECTIFIERS
Derek Albert Paice, Hemel Hempstead, England, assignor to Rotax Limited, London, England
Filed Nov. 7, 1963, Ser. No. 322,199
Claims priority, application Great Britain, Nov. 9, 1962, 42,366/62
6 Claims. (Cl. 321—45)

This invention relates to inverters of the kind including first and second terminals for connection to a D.C. source, a transformer the secondary winding of which provides the required A.C. output, the primary winding of the transformer having a point intermediate its ends connected to the first terminal and its ends connected to the second terminal through circuits including the anodes and cathodes of first and second controlled rectifiers respectively, and means for firing the controlled rectifiers in turn and for switching off the previously conducting controlled rectifier, so that an A.C. output is obtained from the secondary winding of the transformer, said means including an oscillator for supplying pulses to the gates of the controlled rectifiers in turn.

It is found that with an inverter of this kind firing of the controlled rectifiers may be erratic on starting, since the oscillator takes a short while to build up to its normal working level, and the object of the invention is to minimise this disadvantage.

According to the invention, an inverter of the kind specified includes a relay arranged to be energised only when the amplitude of the oscillator output reaches a predetermined level, and a normally closed contact operable by the relay and arranged when closed to short-circuit the gates of the controlled rectifiers to prevent firing thereof.

In the accompanying drawings.

Figure 1:
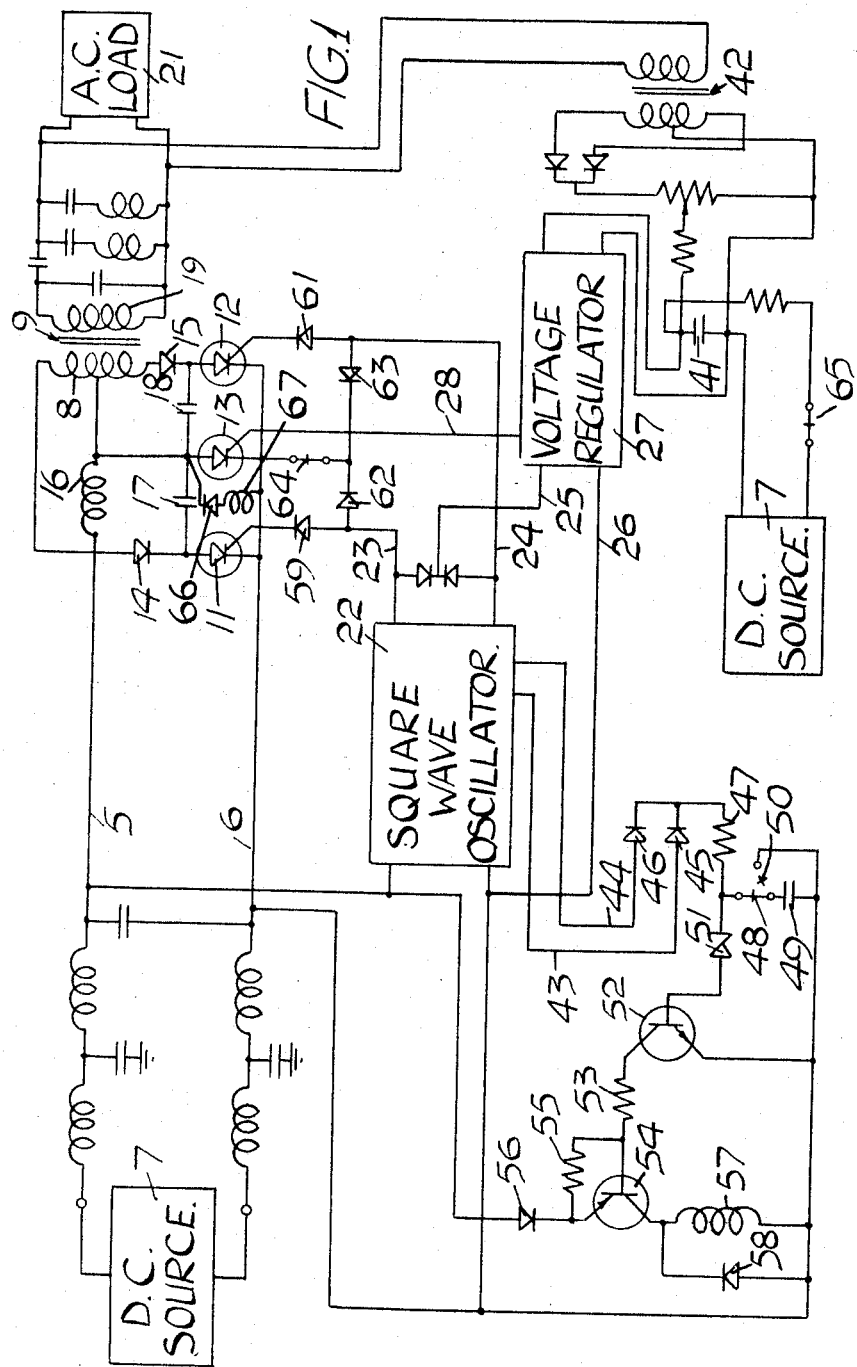
FIGURE 1 is a circuit diagram illustrating one example of the invention.

Referring to the drawings, there are provided first and second supply lines 5, 6 which in use are connected to a D.C. source 7 through capacitors and inductors arranged as shown to minimise any A.C. content in the D.C. signal. The line 5 is connected to an inductor 16 and thence to the mid-point of the primary winding 8 of a transformer 9 whilst the line 6 is connected to the cathode of first, second and third controlled rectifiers 11, 12, 13. The anodes of the rectifiers 11, 12 are connected through a pair of diodes 14, 15 respectively to opposite ends of the primary winding 8 whilst the anode of the rectifier 13 is connected to the cathode of a diode 66, the anode of which is connected through an inductor 67 to the line 6. The anode of rectifier 13 is also connected through a pair of capacitors 17, 18 respectively to the anodes of the rectifiers 11, 12. The transformer secondary winding 19 provides the output from the inverter to an A.C. load 21, a number of capacitors and resistors being included between the winding 19 and load 21 as shown to shape the output voltage to sinusoidal form.

There is further provided a square wave oscillator 22 driven by the D.C. supply and which provides pulses by way of lines 23, 24 to the gates of the controlled rectifiers 11, 12 in turn. Moreover, each time a pulse is supplied to one of the rectifiers 11, 12 an input is fed by way of lines 25, 26 to a voltage regulator 27 which after a variable delay provides a pulse by way of line 28 for firing the controlled rectifier 13. When the controlled rectifier 13 is fired, discharge of one of the pair of capacitors 17, 18 serves to switch off whichever of the controlled rectifiers 11, 12 is conducting. Thus the firing order is first, third, second, third, first, and the output of the inverter is determined by the instants at which the controlled rectifier 13 is fired. This in turn is determined by said delay, which is varied in accordance with the output of the inverter. When the output is high, the delay will be small so that the period of conduction of the controlled rectifiers 11, 12 is small. Likewise, when the output voltage is low the delay is long. If the delay exceeds the time interval between output pulses derived from the square wave oscillator then the controlled rectifiers 11 and 12 turn each other off alternately.

Figure 2:
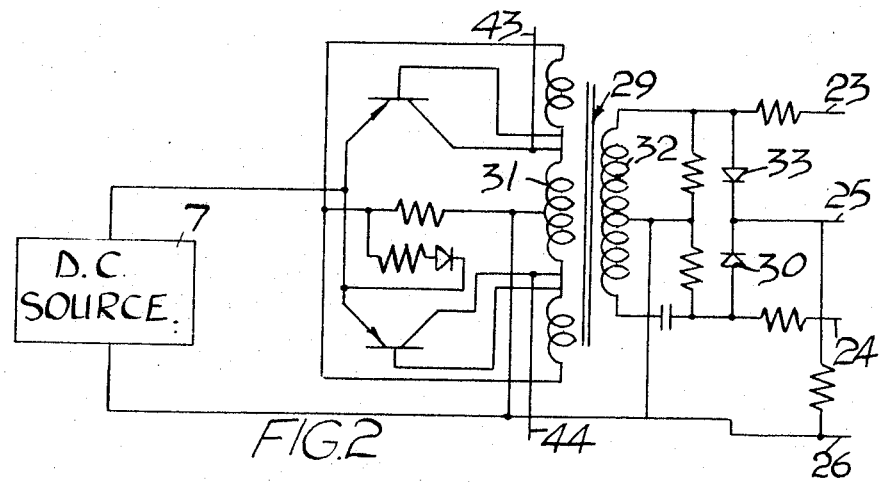
FIGURES 2 and 3 illustrate known forms of oscillator and voltage regulator used in FIGURE 1 with their connections to the D.C. source.
Figure 3:
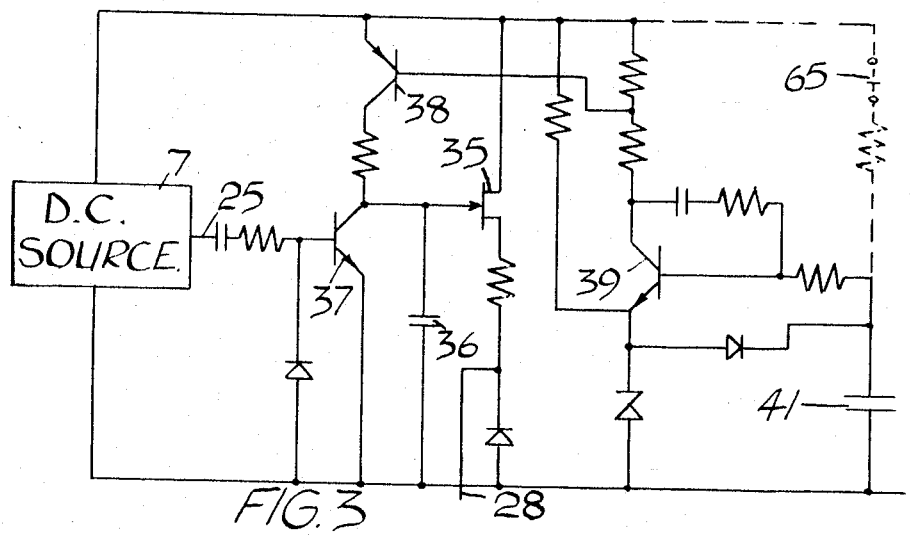

The oscillator 22 and regulator 27 are known and are not therefore described in detail. However, they are shown in FIGURES 2 and 3 so that the outputs from them can readily be identified in FIGURE 1. Referring to FIGURE 2, it will be seen that the oscillator includes a transformer 29 having centre-tapped primary and secondary windings 31, 32 respectively. The outputs on lines 23, 24 in FIGURE 1 are taken from opposite ends of the winding 32, and the output on line 25 is taken by connecting this line to lines 23, 24 through diodes 33, 34 respectively.

The voltage regulator (FIGURE 3) includes a unijunction transistor 35 which when conductive supplies the required pulse to the rectifier 13 by way of line 28. The aforementioned delay is determined by the time taken for a capacitor 36 to charge sufficiently to break down the transistor 35. When either controlled rectifier 11, 12 is rendered conductive, the signal on line 25 renders a transistor 37 momentarily conductive to discharge capacitor 36. Capacitor 36 now charges through a transistor 38 the state of conduction of which is controlled by a transistor 39 which is controlled by the voltage across a capacitor 41 which forms part of the regulator 27 but is shown separately from the regulator in FIGURE 1. The charge on capacitor 41 is determined by the output voltage of the inverter by virtue of the connection through transformer 42 (FIGURE 1) and its associated rectifiers.

The circuit thus far described is known, but in practice would include a number of refinements. However, such refinements are not connected with the improvements now to be described, and they have therefore been omitted for clarity.

With a circuit as described above, starting is often difficult because the oscillator 22 takes a short while to build up to its normal amplitude, and so firing of the controlled rectifiers 11, 12 is erratic. In order to overcome this difficulty opposite ends of the primary winding 31 supply power to lines 43, 44 (FIGURES 1 and 2) which are connected respectively to the anodes of a pair of diodes 45, 46 the cathodes of which are connected to the line 6 through a resistor 47, a first normally-closed relay contact 48 and a capacitor 49 in series. The relay contact serves when in its energised position (indicated at 50) to short-circuit the capacitor 49.

A point intermediate the resistor 47 and contact 48 is connected through the cathode and anode of a Zener diode 51 to the base of a transistor 52 having its emitter connected to the line 6 and its collector connected through a resistor 53 to the base of a transistor 54. The transistor 54 has its emitter and base connected through a resistor 55, its emitter connected to the line 5 through a diode 56 and its collector connected to the second line through a relay coil 57 bridged by a diode 58.

The lines 23, 24 include diodes 59, 61 respectively, and the anodes of the diodes 59, 61 are connected to the anodes of a further pair of diodes 62, 63 having their cathodes connected to the line 6 through a second normally closed relay contact 64 operated by coil 57, which short-circuits any pulses fed to lines 23, 24. The arrangement is such that until the amplitude of signals from the oscillator 22 reaches a predetermined value, insufficient voltage is developed across the capacitor 49 to break down the Zener diode 51. The relay coil 57 therefore remains de-energised, and the controlled rectifiers 11, 12 cannot be fired. However, when the amplitude reaches a predetermined value the Zener diode 51 conducts, the relay coil 57 is energised and the controlled rectifiers 11, 12 are fired in turn.

The controlled rectifier 13 can be fired even when the relay coil is de-energised. Firing of the rectifier 13 before the rectifiers 11, 12 is preferable, since it ensures that the capacitors 17, 18 are charged to the correct polarity. For this reason the resistor 47 and capacitor 49 are chosen to effect delay such that, even if the amplitude of the oscillator output is above the predetermined level initially, the controlled rectifier 13 will be fired first.

Since the capacitor 49 is discharged upon energisation of the relay coil 57, the inverter will stop if the D.C. supply level falls, and will re-start only when the amplitude of the oscillator output reaches said predetermined level.

On starting the circuit described the A.C. output is zero, and so the controlled rectifiers 11, 12 are operated at full power. This is disadvantageous since initial operation of one of the controlled rectifiers 11, 12 at full power may saturate the transformer core. In order to allow the output to build up slowly, the capacitor 41 is charged from the D.C. supply through a third normally closed contact 65 operable by relay coil 57. Until the relay coil 57 is energised, the charge on the capacitor 41 will have the same effect as a predetermined A.C. output. The actual connection of the contact 65 is shown in dotted lines in FIGURE 3.

Having thus described my invention what I claim as new and desire to secure by Letters Patent is:

1. An inverter of the kind using first and second controlled rectifiers under the firing control of oscillator means to supply a load comprising in combination a relay connected to be energised only when the amplitude of the oscillator output reaches a predetermined level, and a normally closed contact operable by the relay and connected when closed to short-circuit the gates of the controlled rectifiers to prevent firing thereof.

2. An inverter as claimed in claim 1, further including means for switching off the conducting controlled rectifier comprising first and second connected capacitors and a third controlled rectifier having its anode connected to the junction between said first and second capacitors and its cathode to the cathodes of the first and second controlled rectifiers, said first and second capacitors being connected to the anodes of the first and second controlled rectifiers respectively and means for firing the third controlled rectifier at variable intervals after the first and second controlled rectifiers are fired, the arrangement being such that when the first and second controlled rectifiers are fired the first and second capacitors are charged respectively, and when the third controlled rectifier is fired the charged capacitor discharges to switch off whichever of the first and second controlled rectifiers is conducting.

3. An inverter as claimed in claim 2 in which the third controlled rectifier is fired by the oscillator independently of the relay, so that if the oscillator output does not initially exceed the value required to energise the relay the third controlled rectifier will be the first to be fired.

4. An inverter as claimed in claim 3 including a delay circuit whereby, even if the initial output of the oscillator is sufficient to energise the relay, the relay will not be energised until the third controlled rectifier is fired.

5. An inverter as claimed in claim 4 in which said intervals are varied in accordance with the output voltage of the inverter so that the larger the output voltage of the inverter the sooner the third controlled rectifier is fired after the first or second controlled rectifier is fired, the inverter further including means for simulating the effect of a predetermined inverter output voltage until the relay is energised.

6. An inverter as claimed in claim 1 further comprising a capacitor; said relay being energised when the voltage across said capacitor reaches a predetermined value, and the relay includes a contact for discharging the capacitor when the relay is energised, so that the inverter ceases to operate if the D.C. supply level falls below a predetermined level.

References Cited by the Examiner
UNITED STATES PATENTS

| | | | |
|---|---|---|---|
| 2,549,807 | 4/1951 | Heed | 321—37 X |
| 3,227,940 | 1/1966 | Gilbert et al. | 321—18 X |
| 3,229,191 | 1/1966 | Williamson | 321—45 |

JOHN F. COUCH, *Primary Examiner.*

W. SHOOP, *Assistant Examiner.*